(12) United States Patent
Nolan et al.

(10) Patent No.: US 7,907,711 B2
(45) Date of Patent: Mar. 15, 2011

(54) SYSTEM AND METHOD FOR NOTIFYING A USER OF A CALLING CARD BALANCE

(75) Inventors: Denis Nolan, Dublin, CA (US); Nancy Book, Palatine, IL (US); Susanne M. Crockett, Buffalo Grove, IL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1294 days.

(21) Appl. No.: 11/478,999

(22) Filed: Jun. 29, 2006

(65) Prior Publication Data

US 2008/0037738 A1 Feb. 14, 2008

(51) Int. Cl.
*H04M 15/00* (2006.01)

(52) U.S. Cl. ............. 379/114.15; 379/114.17; 379/114.2

(58) Field of Classification Search .. 379/114.15–114.2, 379/201.01, 207.02; 455/414.1, 414.3
See application file for complete search history.

(56) References Cited

U.S. PATENT DOCUMENTS

| | | | | |
|---|---|---|---|---|
| 5,353,335 A * | 10/1994 | D'Urso et al. | ............. | 379/114.2 |
| 5,991,380 A | 11/1999 | Bruno et al. | | |
| 6,044,247 A * | 3/2000 | Taskett et al. | ............. | 379/114.2 |
| 6,044,258 A * | 3/2000 | Abdella | ......................... | 455/405 |
| 6,366,645 B1 * | 4/2002 | Khuc et al. | ........................ | 379/13 |
| 6,493,547 B1 * | 12/2002 | Raith | ............................ | 455/405 |
| 6,907,116 B2 | 6/2005 | Ung et al. | | |
| 6,990,330 B2 | 1/2006 | Veerepalli et al. | | |
| 7,280,818 B2 * | 10/2007 | Clayton | ........................ | 455/407 |
| 2003/0157925 A1 | 8/2003 | Sorber et al. | | |

FOREIGN PATENT DOCUMENTS

WO  WO 02/03674 A2  1/2002

* cited by examiner

*Primary Examiner* — Quoc D Tran
(74) *Attorney, Agent, or Firm* — Parks IP Law LLC; Mickki D. Murray, Esq.

(57) ABSTRACT

Systems and methods for notifying a user of a calling card balance are disclosed. Generally, a calling card platform determines a telephone call using a calling card has ended. The calling card platform recalculates a calling card balance after the telephone call has ended and notifies the user of the recalculated balance via a communication channel based on a notification preference. The calling card platform notifies the user of the recalculated balance irrespective of the recalculated calling card balance.

22 Claims, 5 Drawing Sheets

SYSTEM AND METHOD FOR NOTIFYING A USER OF A CALLING CARD BALANCE

BACKGROUND

Prepaid calling cards are accounts where users can typically purchase a predefined number of telephone minutes for a price. Depending on how a user purchases the calling card, the calling card may be a physical card including an account number, or a calling card may be an account number provided to the user. As a user places telephone calls using the calling card, the balance of the calling card declines in proportion to the length of the telephone calls.

Calling card providers often notify a caller of a calling card balance when the caller attempts to place a telephone call using the calling card. However, after completing the telephone call, the caller does not know the calling card balance without placing a second call to the calling card platform. Therefore, it is desirable to have an improved system and method for handling calling cards.

DETAILED DESCRIPTION OF THE DRAWINGS

The present disclosure is directed to systems and methods for automatically notifying a user of a calling card balance. As described below, automatically notifying a user of a calling card balance after the completion of a telephone call provides a calling card platform that better informs customers so that customers are aware of their updated calling card balance without the inconvenience of placing a second call to the calling card platform. Further, automatically providing a calling card balance in the form of an email, a text message, or a telephone call to a user provides an updated calling card balance to the user in a form that is useful to the user as defined by the user.

Additionally, while current calling card platforms may provide calling card balances after a calling card balance falls below a predetermined balance threshold or a predefined trigger event defined by a user occurs, the disclosed systems and methods automatically provide the user with a calling card balance after termination of a telephone call using the calling card irrespective of the calling card balance. Automatically providing a calling card balance irrespective of the calling card balance allows the calling card platform to operate more efficiently due to the fact the system does not perform extra operations to check a calling card balance against any defined balance thresholds or defined trigger events.

Figure 1:
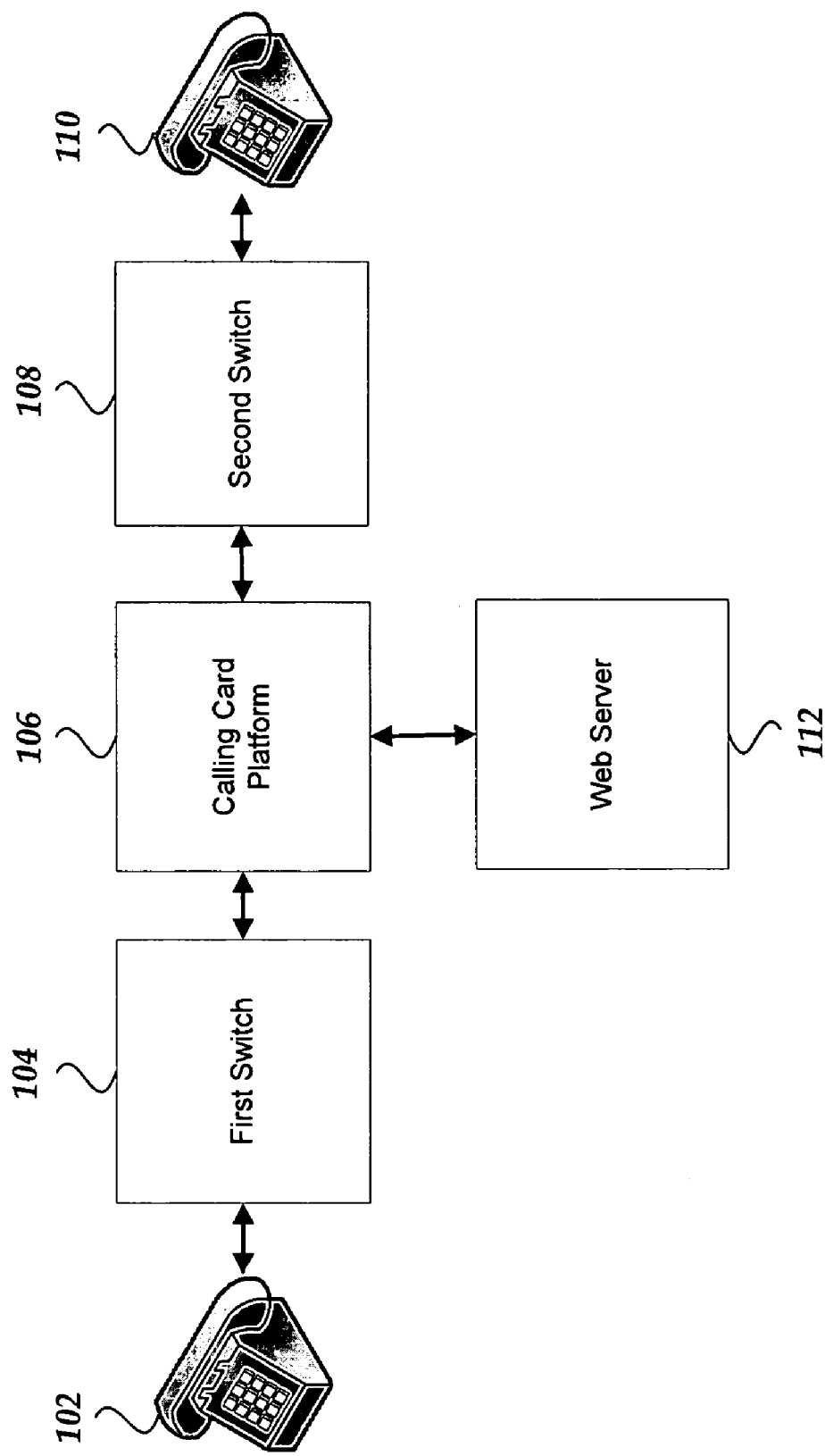
FIG. 1 is a block diagram of one embodiment of a system for notifying a user of a calling card balance.

FIG. 1 is a block diagram of one embodiment of a system for notifying a caller of a calling card balance. The system 100 may include a calling party communication device 102, a first switch 104, a calling card platform 106, a second switch 108, and a called party communication device 110. The calling party communication device 102 and called party communication device 110 may be a telephone, a cellular telephone, a voice over internet protocol ("VOIP") telephone, or any other type of communication device known in the art. The first switch 104, the second switch 108, and the calling card platform 106 may be implemented as software code running in conjunction with a processor such as a single server, a plurality of servers, or any other type of computing device known in the art. In the event the calling party communication device 102 and the called party communication device 110 are cellular telephone devices, the first switch 104 or the second switch 108 may include or be replaced with suitable cellular telephone infrastructure such as a base station and mobile switching center, as is known to those ordinarily skilled in the art. Similarly, if the calling party communication device 102 or the called party communication device 110 are embodied as VOIP telephones, the first switch 104 or the second switch 108 may include or be replaced with a softswitch, again, as is known to those ordinarily skilled in the art. Moreover, these technologies may be suitably mixed to provide communication services in the system 100. The description of the operation of the system 100 is exemplary only. Those ordinarily skilled in the art will recognize how the method and apparatus described herein is extended to these and other communications technologies.

Generally, a caller places a telephone call at the calling party communication device 102 to a telephone number associated with a calling card platform 106. The telephone call is routed through the first switch 104 to the calling card platform 106. The calling card platform 106 receives the telephone call and may be prompted to enter a calling card number. After validating the calling card by performing actions such as receiving the calling card number, the calling card platform 106 may inform the caller of the current calling card balance. After validating the calling card number, the calling card platform 106 additionally determines whether a notification preference is associated with the calling card number.

If the calling card platform 106 determines a notification preference is associated with the calling card number, the calling card platform 106 may prompt the caller for a telephone number to place a telephone call to the called party or prompt the caller to determine if the caller would like to change the notification preference. If the caller would like to change the notification preference, or the calling card platform 106 determines the caller has not set a notification preference, the calling card platform 106 may provide a menu to the caller during the telephone call. The menu may provide options for selecting a notification preference for notifying the caller via a communication channel of a calling card balance after the telephone call is terminated. The caller selects a notification preference and the notification preference is stored.

After receiving the notification preference, the calling card platform 106 prompts the caller for a telephone number of a called party. The calling card platform 106 receives the telephone number and places a second telephone call to the called party communication device 110 through the second switch 108. Once the called party answers the second telephone call, the calling party and the called party are bridged and the call is completed.

When the call between the caller and the called party is terminated, the calling card platform 106 recalculates a calling card balance. The calling card platform 106 then automatically notifies the caller of the calling card balance via a communication channel based on the notification preference associated with the calling card irrespective of the calling card balance.

As discussed above, a caller may set a notification preference associated with a calling card number. In one embodiment, the calling card platform is in communication with a web server 112 so that the caller may set the notification preference at a webpage associated with the calling card number. In other embodiments, the caller may set a notification preference when placing a call to the calling card platform 106 in addition to setting a notification preference at a webpage. Typically, the caller may choose to be notified via communication channels such as sending an email to the caller including the calling card balance, sending a text message to the caller including a calling card balance, or placing a telephone call to the caller which informs the caller a calling card balance. In order for the calling card platform 106 to send an email, a text message, or place a telephone call, the calling card platform 106 should have contact information such as an e-mail address or a telephone number associated with the calling card number. In one implementation, the caller inputs an email address or a telephone number at a webpage associated with the calling card platform 106. In other implementations, the calling card platform 106 may extract e-mail addresses or telephone numbers from an e-mail sent to the calling card platform, or receive an email address or telephone number from a caller during a telephone call to the calling card platform and performing operations such as speech-to-text conversion.

Figure 2A:
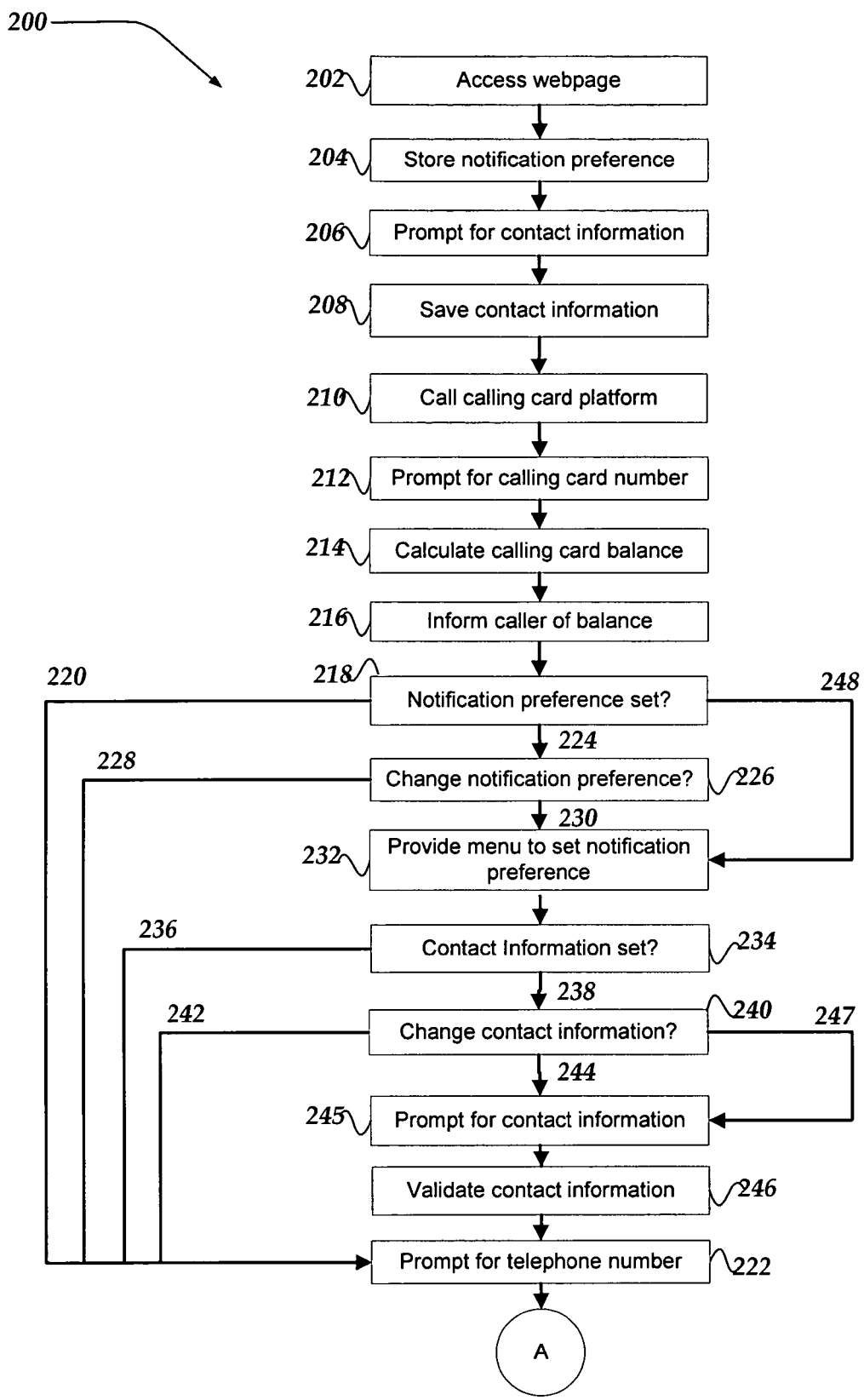
FIGS. 2a and 2b are flow charts of one embodiment of a method for automatically notifying a user of a calling card balance.
Figure 2B:
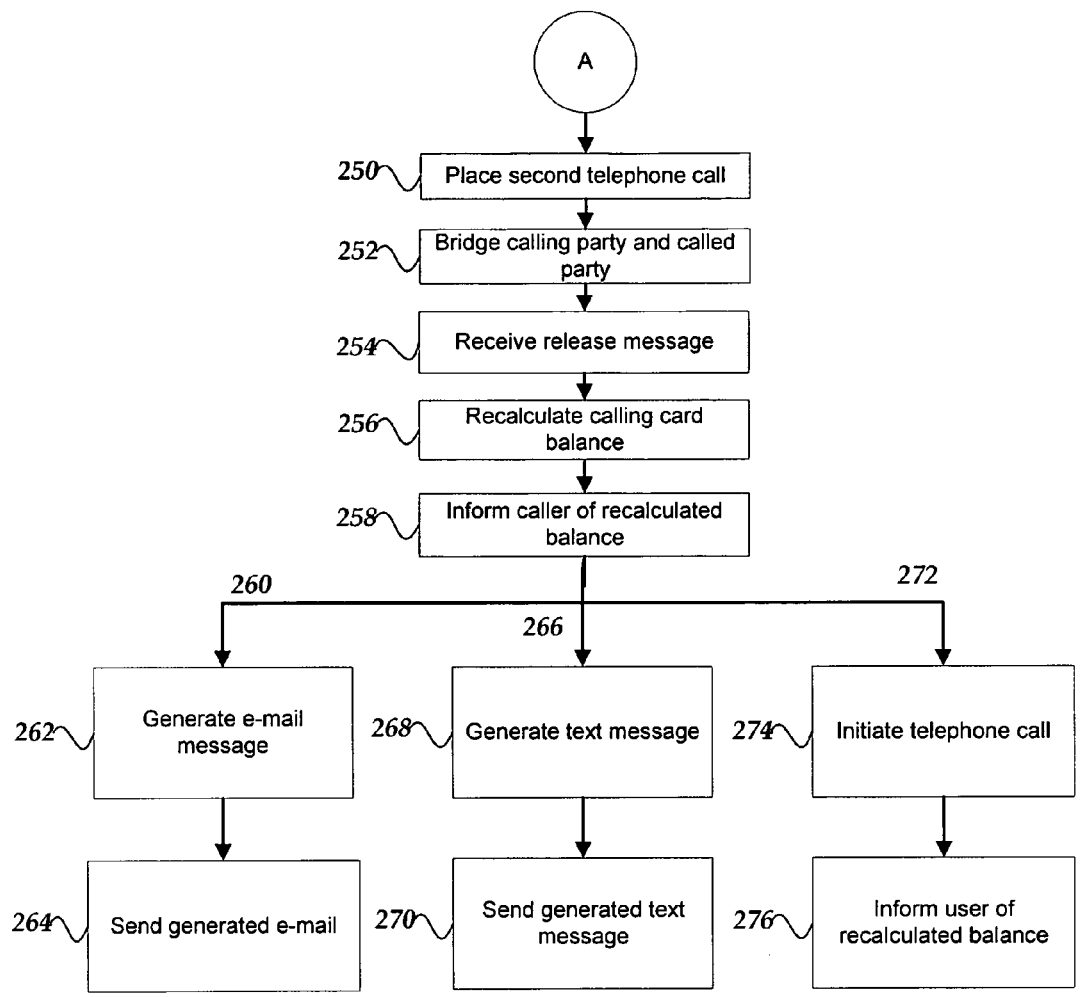

FIGS. 2a and 2b are flow charts of one embodiment of a method for sending a calling card balance to a caller. The method 200 begins with a caller accessing a webpage associated with a calling card platform at block 202. While accessing the webpage, the caller may store a notification preference associated with a calling card number at block 204. As discussed above, in one implementation, the caller may choose to have the calling card platform send an e-mail to the caller with a calling card balance, send a text message to the caller with a calling card balance, or place a telephone call to the caller to inform the caller of a calling card balance. Depending on the notification preference selected by the caller at block 204, the calling platform prompts the caller for contact information at block 206. For example, if the caller chooses the e-mail notification preference, the calling card platform may prompt the caller for an e-mail address. Alternatively, if the caller chooses the text message or phone call notification preference, the calling card platform may prompt the caller for a telephone number. After receiving the contact information from the caller, the calling card platform saves the notification preference associated with the calling card number at block 208.

To place a telephone call to a called party, the caller places a telephone call to the calling card platform at block 210. The telephone call is routed to the calling, card platform and the calling card platform prompts the caller for a calling card number at block 212. The calling card platform receives the calling card number and calculates a calling card balance at block 214. The calling card platform informs the caller of the calling card balance at block 216.

After receiving the calling card number, the calling card platform additionally determines whether the calling card number is associated with a notification preference at block 218. In one implementation, if the calling card platform determines the calling card number is associated with a notification preference 220, the calling card platform prompts the caller for a telephone number for a called party at block 222. In other implementations, if the calling card platform determines the calling card number is associated with a notification preference 224, the calling card platform may prompt the caller to determine if the caller would like to change the notification preference 226. If the caller indicates the notification preference should not be changed 228, the calling card platform prompts the caller for a telephone number for a called party at block 222. However, if the caller indicates the notification preference should be changed 230, the calling card platform provides a menu to a caller for changing a notification preference at block 232.

In one embodiment, the menu provides options to the caller such as emailing a calling card balance to the caller, text messaging a calling card balance to the caller, and placing a telephone call to the caller with the calling card balance. The calling card platform receives a notification preference from the caller and determines whether the caller has previously provided contact information associated with the notification preference at block 234. In one implementation, if the calling card platform determines the caller has provided contact information associated with the notification preference 236, the calling card platform proceeds to prompt the caller for a telephone number for a called party at block 222. Contact information associated with the notification preference may include information such as an e-mail address or a telephone number.

In other implementations, if the calling card platform determines the caller has provided contact information associated with the notification preference 238, the calling card platform prompts the caller to determine whether the caller would like to change the contact information at block 240. If the calling card provider receives an indication that the caller would not like to change the contact information 242, the calling card platform proceeds to prompt the caller for a telephone number for a called party at block 222. However, if the calling card provider receives an indication that the caller would like to change the contact information 244, the calling card platform prompts the caller for the new contact information at block 245. The new contact information is received and validated for correctness at block 246. For example, the calling card platform may determine that a telephone number has the correct number of digits or may determine that an e-mail address is in a proper format. After validating the contact information, the calling card platform prompts the caller for a telephone number for a called party at block 222.

If at block 234 the calling card platform determines that the caller has not previously provided contact information 247, the calling card provider prompts the caller for contact information and repeats the process described above starting at block 245.

If at block 218 the calling card platform determines that a notification preference is not associated with the calling card number 248, the calling card platform provides a menu to the caller for setting a notification preference and repeats the process described above starting at block 232. After the notification preference is set, the calling card platform prompts the caller for a telephone number for a called party at block 222.

The calling card platform places a second telephone call to the telephone number of the called party at block 250. After detecting the called party answer the telephone call, the caller and the called party are bridged at block 252. When the call between the caller and the called party ceases, the calling card platform receives a release message 254. In response to the release message, the calling card platform recalculates a calling card balance after the telephone call between the caller and the called party at block 256. Irrespective of the calling card balance, the calling card platform automatically informs the caller of the recalculated balance at block 258 via a communication channel based on the notification preference associated with the calling card number.

If the notification preference is an e-mail message 260, the calling card provider generates an e-mail message at block 262 including the recalculated balance. The calling card provider sends the generated email to the e-mail address associated with the calling card number at block 264 and the method 200 ends.

If the notification preference is a text message 266, the calling card provider generates a text message at block 268 including the recalculated balance. The calling card provider sends the generated text message to a telephone number associated with the calling card number at block 270 and the method 200 ends.

If the notification preference is a telephone call 272, the calling card provider initiates a telephone call to a telephone number associated with the calling card number at block 274. Once the telephone call is answered either by a user or an answering service of the user, such as voicemail, the calling card platform informs the user of the recalculated balance at block 276 and the method 200 ends.

In some implementations, in addition to calculating a calling card balance for a domestic telephone call, the calling card platform may calculate a balance for an international call based on a foreign country associated with the calling card number. As part of setting notification preferences described above, a caller may set a destination country associated with the calling card number when accessing a webpage associated with the calling card number. Therefore, when a calling card platform recalculates a calling card balance after completion of a telephone call, the calling card platform recalculates the calling card balance in terms of a domestic balance and in terms of an international balance based on the destination country associated with the calling card. When the calling card platform then informs the caller of the recalculated calling card balance, the calling card platform informs the caller of both the domestic balance and the international balance, the domestic balance only, or the international balance only.

Figure 3:
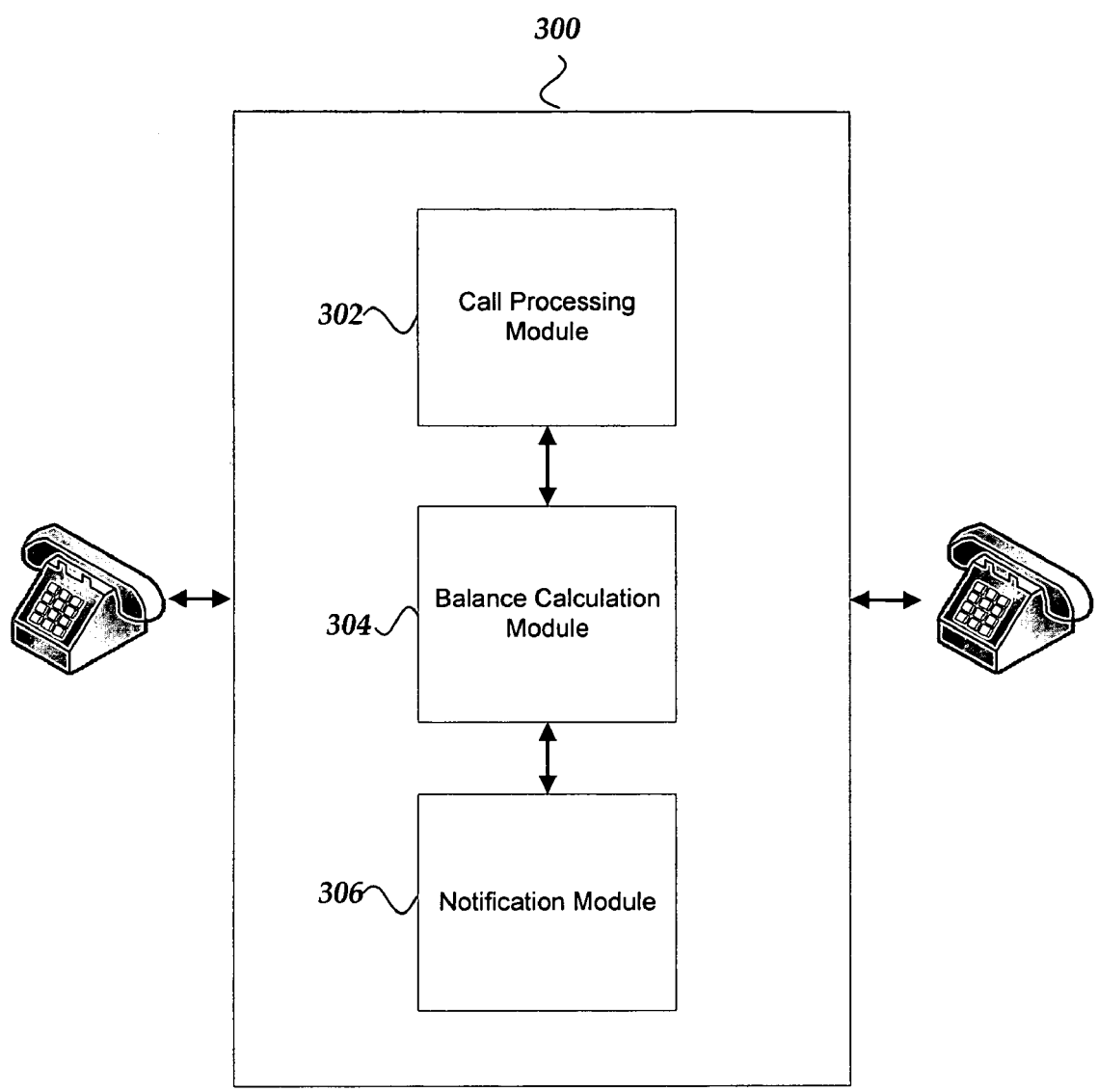
FIG. 3 is a block diagram of one embodiment of a system for notifying a user of a calling card balance.

FIG. 3 is a block diagram of one embodiment of a system for notifying a user of a calling card balance. The system 300 may include a call processing module 302, a balance calculation module 304 in communication with at least the call processing module 302, and a notification module 304 in communication with at least the call processing module 302 and the balance calculation module 304. The call processing module 302, balance calculation module 304, and notification module 306 may be implemented as software code running in conjunction with a processor such as a single server, a plurality of servers, or any other type of computing device known in the art.

In one embodiment, the call processing module 302, balance calculation module 304, and notification module 306 may implement the method described above with respect to FIG. 2. The call processing module 302 is generally operative to perform actions such as authenticating a user, interacting with a user to set notification preference and obtaining contact information associated with a calling card, placing a telephone call for the user to a called party using the calling card, and detect when the telephone call using the calling card has ended. The balance notification module 304 is generally operative to perform actions such as recalculating a calling card balance after a telephone calling using the calling card has ended. Finally, the notification module 306 is generally operative to notify a user of the recalculated calling card balance, irrespective of the calling card balance, via a communication channel based on a notification preference as described above.

During operation, a caller may access a calling card platform via the call processing module 302 and perform actions described above such as setting a notification preference. At the request of the caller, the call processing module 302 places a telephone call to a called party and connects the caller to the called party. When the telephone call ends, the call processing module 302 detects the end of the telephone call and notifies the balance notification module 304 that the telephone call has ended.

In response to the notification that the telephone call has ended, the balance notification module 304 recalculates a balance for the calling card and notifies the notification module 306 of the recalculated balance. The notification module 306 receives the recalculated balance and determines a notification preference associated with the calling card. The notification module 306 then notifies a user of the recalculated balance, irrespective of the recalculated balance, via a communication channel based on the notification preference. As described above, the notification module 306 may perform actions such as sending an e-mail to an e-mail address associated with the calling card, send a text message to a telephone number associated with the calling card, or place a separate telephone call to a telephone number associated with the calling card to inform the user of the recalculated balance.

Figure 4:
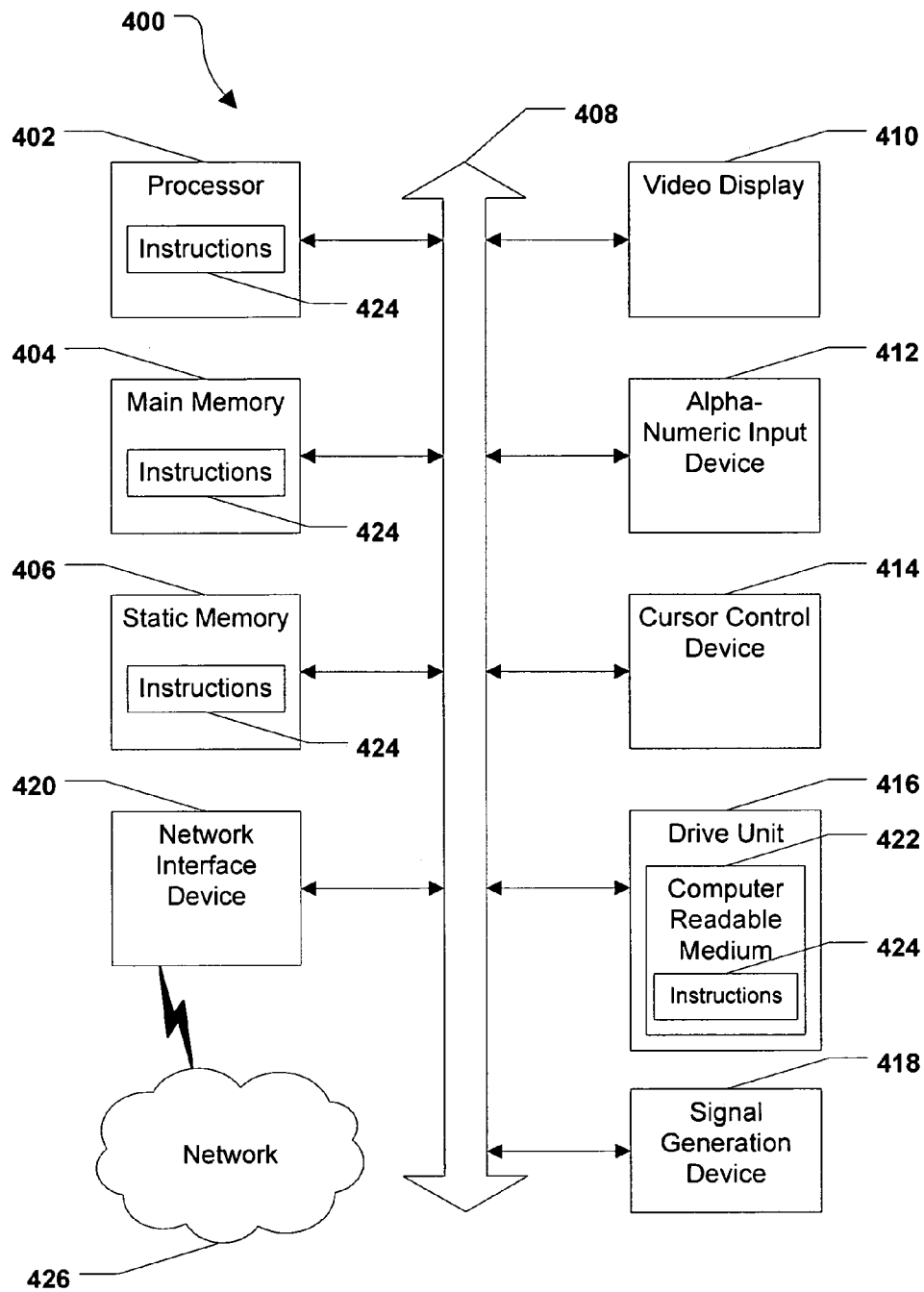
FIG. 4 is an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The subject matter disclosed above is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method for notifying a user of a calling card balance, the method being implemented by a computer system including a call processing module, a balance calculation module, and a notification module, and the method comprising:
   the notification module obtaining notification preferences associated with a calling card including a desired notification communication channel and a destination country;
   the call processing module determining that a first telephone call using the calling card has ended;
   the balance calculation module, after the call processing module determines that the first telephone call has ended, recalculating a calling card balance, including generating a first, domestic balance and a second, international balance based on the destination country of the notification preferences; and
   the notification module notifying the user of the recalculated calling card balance, irrespective of the recalculated calling card balance, via a communication channel based on the notification preferences of the user, wherein the recalculated calling card balance has a format selected from a group of formats consisting of:
   the domestic balance;
   the international balance; and
   both the domestic balance and the international balance.

2. The method of claim 1, wherein notifying the user of the recalculated calling card balance comprises:
   placing a second telephone call to a telephone number associated with the calling card; and
   communicating the recalculated calling card balance during the second telephone call.

3. The method of claim 1, wherein notifying the user of the recalculated calling card balance comprises:
   sending an e-mail message comprising the recalculated calling card balance to an e-mail address associated with the calling card.

4. The method of claim 1, wherein notifying the user of the recalculated calling card balance comprises:
   sending a text message comprising the recalculated calling card balance to a telephone number associated with the calling card.

5. The method of claim 1, further comprising: receiving a selection of the destination country from the user.

6. The method of claim 1, further comprising: receiving a selection of the notification preferences from the user.

7. The method of claim 6, wherein the selection of the notification preferences is received at a webpage.

8. The method of claim 1, further comprising:
   determining the user has not set the notification preferences;
   providing a menu to the user during the first telephone call using the calling card, the menu providing one or more notification options for the user to receive a calling card balance;
   receiving a selection of the notification preferences; and
   storing the received notification preferences.

9. A computerized calling card platform configured to:
   obtain notification preferences associated with a calling card including a desired notification communication channel and a destination country;
   determine that a telephone call using the calling card has ended;
   after determining that the telephone call has ended, recalculate a calling card balance, including generating a first, domestic balance and a second, international balance based on the destination country of the notification preferences; and
   notify a user of the recalculated calling card balance, irrespective of the recalculated calling card balance, via a communication channel based on the notification preferences associated with the calling card, wherein the recalculated calling card balance has a format selected from a group of formats consisting of:
   the domestic balance;
   the international balance; and
   both the domestic balance and the international balance.

10. The calling card platform of claim 9, wherein the calling card platform, in being configured to notify a user of the recalculated calling card balance, is configured to send an e-mail to an e-mail address associated with the calling card comprising the recalculated calling card balance.

11. The calling card platform of claim 9, wherein the calling card platform, in being configured to notify a user of the recalculated calling card balance, is configured to send a text message to a telephone number associated with the calling card comprising the recalculated calling card balance.

12. The calling card platform of claim 9, wherein the calling card platform, in being configured to notify a user of the recalculated calling card balance, is configured to place a second telephone call to a telephone number associated with the calling card and inform the user of the recalculated calling card balance during the second telephone call.

13. A tangible, non-transitory computer-readable storage medium comprising a set of instructions configured to direct a computer system to perform acts of:
   obtaining notification preferences associated with a calling card including a desired notification communication channel and a destination country;
   determining that a telephone call using the calling card has ended; and
   after determining that the telephone call has ended, notifying a user of a recalculated calling card balance, irrespective of the recalculated calling card balance, via a communication channel based on a notification preferences associated with the calling card, wherein the recalculated calling card the user has a format selected from a group of formats consisting of:
   the domestic balance;
   the international balance; and
   both the domestic balance and the international balance.

14. The tangible, non-transitory computer-readable storage medium of claim 13, further comprising a set of instructions to direct the computer system to perform the act of:
   recalculating the calling card balance, after the telephone call has ended, including generating a first, domestic balance and a second, international balance based on the destination country of the notification preferences.

15. A system for notifying a user of a calling card balance comprising:
   a notification module configured to obtain notification preferences associated with a calling card including a desired notification communication channel and a destination country;
   a call processing module configured operative to detect that a first telephone call using the calling card has ended
   a balance calculation module in communication with the call processing module, the balance calculation module being configured to, after the call processing module detects that the first telephone call has ended, recalculate the calling card balance, including generating a first, domestic balance and a second, international balance based on the domestic country of the notification preferences; and the notification module being further configured to notify the user of the recalculated calling card balance after the telephone call has ended, irrespective of the recalculated calling card balance, via a communication channel based on the notification preferences associated with the calling card, wherein the recalculated calling card balance has a format selected from a group of formats consisting of:
the domestic balance;
the international balance; and
both the domestic balance and the international balance.

16. The system of claim 15, wherein the notification module, in being configured to notify the user of the recalculated calling card balance, is configured to, send an e-mail to an e-mail address associated with the calling card comprising the recalculated calling card balance.

17. The system of claim 15, wherein the notification module, in being configured to notify the user of the recalculated calling card balance, is configured to send a text message to a telephone number associated with the calling card comprising the recalculated calling card balance.

18. The system of claim 15, wherein the notification, in being configured to notify the user of the recalculated calling card balance, is configured to place a second telephone call to a telephone number associated with the calling card and inform the user of the recalculated calling card balance during the second telephone call.

19. The method of claim 1, further comprising:
determining that the user has set the notification preference;
generating a communication for the user presenting an option to change the notification preference;
providing the communication to the user;
receiving a response from the user indicating whether the user desires to change the notification preference; and
if the user response indicates a change to the preferences:
updating the preferences accordingly;
wherein the notification module, in notifying the user of the recalculated calling card balance, notifies the user in accordance with the updated notification preference.

20. The calling card platform of claim 9, wherein the calling card platform is further configured to:
determine that the user has set the notification preference;
generate a communication for the user presenting an option to change the notification preference;
provide the communication to the user;
receive a response from the user indicating whether the user desires to change the notification preference; and
if the user response indicates a change to the preferences:
update the preferences accordingly;
wherein notifying the user of the recalculated calling card balance is performed in accordance with the updated notification preference.

21. The computer-readable storage medium of claim 13, further comprising a set of instructions to direct the computer system to perform the acts of:
determine that the user has set the notification preference;
generate a communication for the user presenting an option to change the notification preference;
provide the communication to the user;
receive a response from the user indicating whether the user desires to change the notification preference; and
if the user response indicates a change to the preferences:
update the preferences accordingly;
wherein notifying the user of the recalculated calling card balance is performed in accordance with the updated notification preference.

22. The system of claim 15, wherein the notification module, is further configured to:
determine that the user has set the notification preference;
generate a communication for the user presenting an option to change the notification preference;
provide the communication to the user;
receive a response from the user indicating whether the user desires to change the notification preference; and
if the user response indicates a change to the preferences:
update the preferences accordingly;
wherein the notification module, in notifying the user of the recalculated calling card balance, notifies the user in accordance with the updated notification preference.

* * * * *